United States Patent [19]
Li et al.

[11] Patent Number: 6,078,710
[45] Date of Patent: Jun. 20, 2000

[54] METHOD AND SYSTEM FOR PROVIDING A MULTI-CHANNEL OPTICAL FILTER

[75] Inventors: Wei-Zhong Li, San Jose; Feng Liu, Sunnyvale, both of Calif.

[73] Assignee: Oplink Communications, Inc., San Jose, Calif.

[21] Appl. No.: 09/054,031

[22] Filed: Apr. 2, 1998

[51] Int. Cl.$^7$ .................................................. G02B 6/26
[52] U.S. Cl. .................................................. 385/39; 385/24
[58] Field of Search ............................... 385/15, 24, 39, 385/47, 73, 140

[56] References Cited

U.S. PATENT DOCUMENTS

| | | | |
|---|---|---|---|
| 4,548,478 | 10/1985 | Shirasaki | 350/377 |
| 5,082,343 | 1/1992 | Coult et al. | 385/34 |
| 5,287,214 | 2/1994 | Robertson et al. | 359/260 |
| 5,361,155 | 11/1994 | Chiaroni et al. | 359/131 |
| 5,453,827 | 9/1995 | Lee | 356/73.1 |
| 5,481,402 | 1/1996 | Cheng et al. | 359/498 |
| 5,504,608 | 4/1996 | Neeves et al. | 359/124 |
| 5,506,920 | 4/1996 | Suemura et al. | 385/25 |
| 5,588,078 | 12/1996 | Cheng et al. | 385/33 |
| 5,642,448 | 6/1997 | Pan et al. | 385/31 |
| 5,781,332 | 7/1998 | Ogata | 359/308 |
| 5,781,341 | 7/1998 | Lee | 359/578 |
| 5,848,203 | 12/1998 | Kawakami et al. | 385/11 |
| 5,889,904 | 3/1999 | Pan et al. | 385/24 |

*Primary Examiner*—John D. Lee
*Assistant Examiner*—M. R. Connelly-Cushwa
*Attorney, Agent, or Firm*—Sawyer Law Group LLP

[57] ABSTRACT

A system and method for providing filtering is disclosed. The system and method include providing a first fiber and a second fiber. The first fiber is for carrying a first optical signal. The second fiber is for carrying a second optical signal. The method and system further include providing a holder, a filter, a first wedge, and a third fiber. The holder is for receiving the first optical fiber and the second optical fiber therein. The filter is for filtering the first and second optical signals to provide a first and a second filtered optical signal, respectively. The first wedge is disposed between the holder and the filter. The first wedge is for directing the first optical signal towards the filter in a first path and for directing the second optical signal toward the filter in a second path. The third fiber is for receiving the first filtered optical signal. The fourth optical fiber is for receiving the second filtered optical signal.

26 Claims, 3 Drawing Sheets

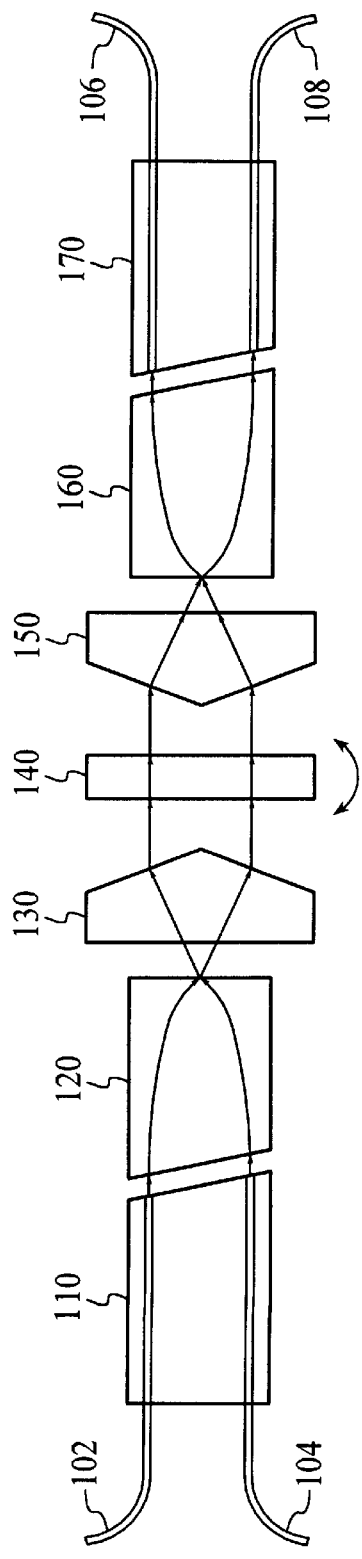
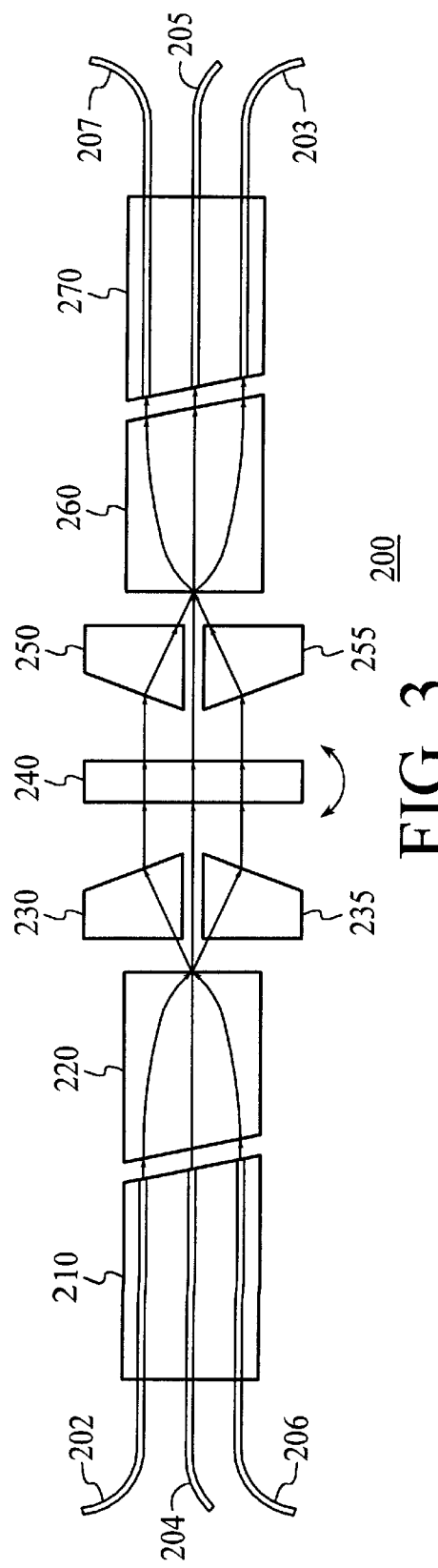

METHOD AND SYSTEM FOR PROVIDING A MULTI-CHANNEL OPTICAL FILTER

FIELD OF THE INVENTION

The present invention relates to optical technology, and more particularly to a method and system for filtering an optical signal.

BACKGROUND OF THE INVENTION

Optical technology utilizes optical signals in order to carry information. Optical technology also utilizes filters for a variety of applications. Filters transmit light in a pass band. The pass band of the filter is a range of wavelengths centered around a central wavelength. For example, one application for filters is in multiplexing and demultiplexing optical signals. It is possible to transmit a plurality of signals on a single fiber. As the use of optical technology increases, the number of signals transmitted on a single fiber also increases. Currently, signals having four, eight, sixteen or more channels are transmitted on a single fiber. Typically, each channel is centered around a different wavelength.

In order to transmit a large number of signals on a given cable, channels for a plurality of wavelengths are multiplexed together for transmission. After the multiplexed, multi-channel signal reaches the destination, the channels are demultiplexed to access the information carried by a single channel. Conventional wavelength division multiplexers ("WDMs") are used to combine individual signals as well as to separate a composite signal into individual channels.

In order to function, some conventional WDMs utilize filtering. To separate a composite signal into its component channels, conventional filtering WDMs use a plurality of filters cascaded in series to isolate each channel. Each filter passes light centered around a single wavelength. A filter is typically provided for each of the component wavelengths. The output of each filter is the signal centered around a single wavelength. As each component wavelength is separated from the composite signal, the remaining portion of the composite signal is passed on to the next filter in the series. Thus, the signal is separated into its components. Note that other applications may also use filters. In general, filters are useful in applications where it is desired to remove a portion of the signal outside of the filter's pass band. Thus, in addition to WDMs, filters may be used in noise removal or other applications.

Typically, a signal is input to a conventional filtering system via an optical fiber. The fiber is typically held by a capillary. The signal is then provided to a graduated index of refraction (GRIN) lens for collimating. The signal is then transmitted to a filter. The filter transmits light centered around a particular wavelength. In a conventional WDM, a separate filtering system is used for each channel.

Although conventional systems for filtering signals are capable of transmitting light in the pass band, a conventional filter is used with a fixed angle of incidence. Thus, the central wavelength for the pass band is also fixed. As a result, the filter itself will be subject to tighter specifications in order to ensure that the appropriate portion of the signal is transmitted. The tighter specifications make the filter more expensive. In addition, one filter is typically used for each channel. As a result, the cost of providing filters for a composite signal is high. In addition, the filters will occupy a relatively large space.

Accordingly, what is needed is a system and method for providing a filter which is low cost, efficient, and compact. The present invention addresses such a need.

SUMMARY OF THE INVENTION

The present invention provides a system and method for providing filtering. The system and method comprise providing a first fiber and a second fiber. The first fiber is for carrying a first optical signal. The second fiber is for carrying a second optical signal. The method and system further comprise providing a holder, a filter, a first wedge, and a third fiber. The holder is for receiving the first optical fiber and the second optical fiber therein. The filter is for filtering the first and second optical signals to provide a first and a second filtered optical signal, respectively. The first wedge is disposed between the holder and the filter. The first wedge is for directing the first optical signal towards the filter in a first path and for directing the second optical signal toward the filter in a second path. The third fiber is for receiving the first filtered optical signal. The fourth optical fiber is for receiving the second filtered optical signal.

According to the system and method disclosed herein, the present invention is capable of providing filtering cheaply while requiring less space, thereby increasing overall system performance.

BRIEF DESCRIPTION OF THE DRAWINGS

FIG. 2 is a block diagram of a one embodiment of a filter in accordance with the present invention.

FIG. 3 is a block diagram of another embodiment of a filter in accordance with the present invention.

DETAILED DESCRIPTION OF THE INVENTION

The present invention relates to an improvement in optical technology including filters. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
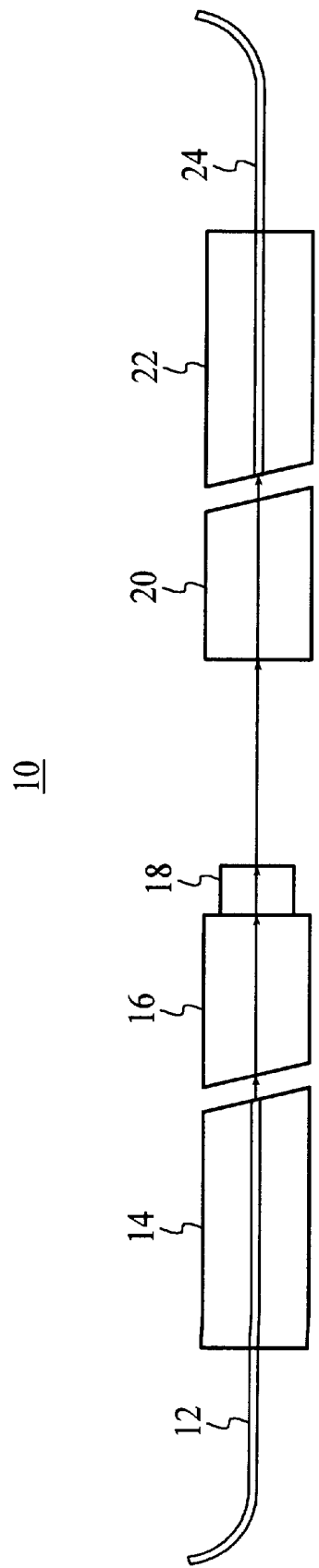
FIG. 1 is a block diagram of a conventional filter.

FIG. 1 is a block diagram of a conventional system 10 for filtering an optical signal. The conventional filtering system 10 is used to filter a signal carried on optical fiber 12. The signal is input from fiber 12 which is held in place by a capillary 14. The signal is transmitted to a graduated index of refraction (GRIN) lens 16 which collimates the signal. After collimation, the composite signal is transmitted to a filter 18. The filter 18 transmits light in a pass band having a range of wavelengths a centered around a central wavelength. The transmitted light passes through a second GRIN lens 20 to a second fiber 24 held in place by a second capillary 22. Consequently, a filtered signal can be provided on the fiber 24. Thus, the conventional system can be used in applications which remove a portion of an optical signal, for example in a wavelength division multiplexer ("WDM"), not shown, which uses filters to isolate individual channels of a composite signal.

Although the conventional filtering system 10 is capable of filtering optical signals, one of ordinary skill in the art will recognize that the angle between the GRIN lens 16 and the filter 18 is typically fixed. The angle of incidence between the signal and a normal to the surface of the filter 18 is, therefore, also fixed. The central wavelength of the pass band depends on the angle of incidence. Because the angle of incidence is fixed, the central wavelength of the pass band for the filter 18 does not change. Consequently, the filter 18 must be manufactured to transmit only the appropriate range of wavelengths. These more stringent specifications increase the difficulty in and cost of producing a filter 18 and, therefore, any system which utilizes the filter 18.

In addition, when the conventional filtering system 10 is used in a WDM, a conventional filtering system 10 is provided for each channel desired to be isolated. Each conventional filtering system 10 occupies a certain amount of space. As a result, the space used by the conventional filtering system 10 is relatively large for a large number of channels.

Accordingly, what is needed is a system and method for providing a filtering system which can utilize filtering technology without a substantial increase in cost of or space occupied by the filter. The present invention addresses such a need.

The present invention provides for a method and system for providing a filtering system. The present invention will be described in terms of a filter and a filtering WDM. However, one of ordinary skill in the art will readily recognize that this method and system will operate effectively for other types of WDMs for which filtering is desirable. The present invention will also be discussed in terms of filtering a particular number of channels. However, one of ordinary skill in the art will readily recognize that nothing prevents the method and system from being used with another number of channels. Moreover, the present invention will be described in conjunction with separating a composite signal into its components. However, nothing prevents the present invention from being used in a WDM which combines signals.

To more particularly illustrate the method and system in accordance with the present invention, refer now to FIG. 2 depicting a block diagram of one embodiment 100 of such a system. The system 100 includes two fibers 102 and 104. The fibers are retained in a holder 110. Adjacent to the holder is a lens 120 for collimating the signals from the fibers 102 and 104. In a preferred embodiment, the lens 120 is a GRIN lens. The system 100 includes a first glass wedge 130, a filter 150, and a second glass wedge 150. The first glass wedge 130 and the second glass wedge 150 can change the direction of light transmitted by each of the wedges 130 and 140. The system 100 further includes a second lens 160, and a second holder 170 having a portion of two fibers 106 and 108 therein.

The system 100 in accordance with the present invention is used to provide filtering. Consequently, two optical signals are input through the fibers 102 and 104. The fibers 102 and 104 pass through the holder 110. In a preferred embodiment, the holder 110 is a capillary. The optical signals are then collimated by a lens 120. The optical signals are transmitted through a first wedge 130. In a preferred embodiment, the first wedge 130 is configured to ensure that the two optical signals are substantially parallel after exiting the first wedge 130.

The two signals are then transmitted by the filter 150 to reduce noise associated with each signal. The filter 140 is tuned so that the range of wavelengths in the pass band transmitted by the filter includes the two signals. In a preferred embodiment, the filter 140 can be tilted to change the angle of incidence of the signals with the filter 140. The filter 140 transmits a relatively broad range of wavelengths with respect to the range of wavelengths carried by each optical signal. Thus, in a preferred embodiment, the filter 140 transmits a range of wavelengths that is larger than and includes each of the channels being filtered.

The filtered signals are then provided to the second wedge 150 which can change the direction of propagation of the filtered signals. In a preferred embodiment, the direction of propagation of the filtered signals is changed from substantially parallel so that the filtered signals will be focused by the lens 160 to the fibers 106 and 108.

Because the filter 140 can be rotated, the central wavelength of the pass band for the filter 140 can be changed. Thus, the filter 140 can be tuned to transmit the appropriate channel(s). The filter 140 need not be extremely accurately manufactured. Consequently, manufacturing of the filter 140 is simplified, the manufacturing yield may be increased, and the filter's 140 cost reduced. Because each filter 140 filters more than one input signal, fewer filters 140 may be used. Thus, the cost of the filtering system 100 used is reduced. The space required by the system 100 is also reduced.

FIG. 3 depicts an alternate embodiment 200 of a system for filtering an optical signal. In the system 200, three signals are input through three fibers, 202, 204, and 206 held by holder 210. These signals are collimated by a lens 220, which is preferably a GRIN lens. The signals are then transmitted to a first set of wedges 230 and 235. Although depicted in two parts, the first set of wedges 230 and 235 can be a single wedge. For example, the single wedge, not shown, could have a hole drilled through the center or a flat front face for transmitting the middle signal.

The optical signals are then provided to a filter 240. The filter 240 can be rotated. Consequently, the angle of incidence between each of the three signals and the filter 240 can be changed. As a result, the filter 240 can be tuned so that the filter 240 transmits the desired range(s) of wavelengths of light. The filtered signals are provided via a second set of wedges 250 and 255 to a second lens 260, which is preferably a GRIN lens. The filtered signals, from fibers 202, 204, and 206, are transmitted through the three fibers 207, 205, and 203, respectively.

Because the filter 240 can be rotated, the central wavelength of the pass band for the filter 240 can be changed. Thus, the filter 240 can be tuned to transmit the appropriate channel(s). The filter 240 need not be extremely accurately manufactured. Consequently, manufacturing of the filter 240 is simplified, the manufacturing yield may be increased, and the filter's 240 cost reduced. Because each filter 240 filters more than one input signal, fewer filters 240 may be used. Thus, the cost of the filtering system 200 used is reduced. The space required by the system 200 is also reduced.

Figure 4:
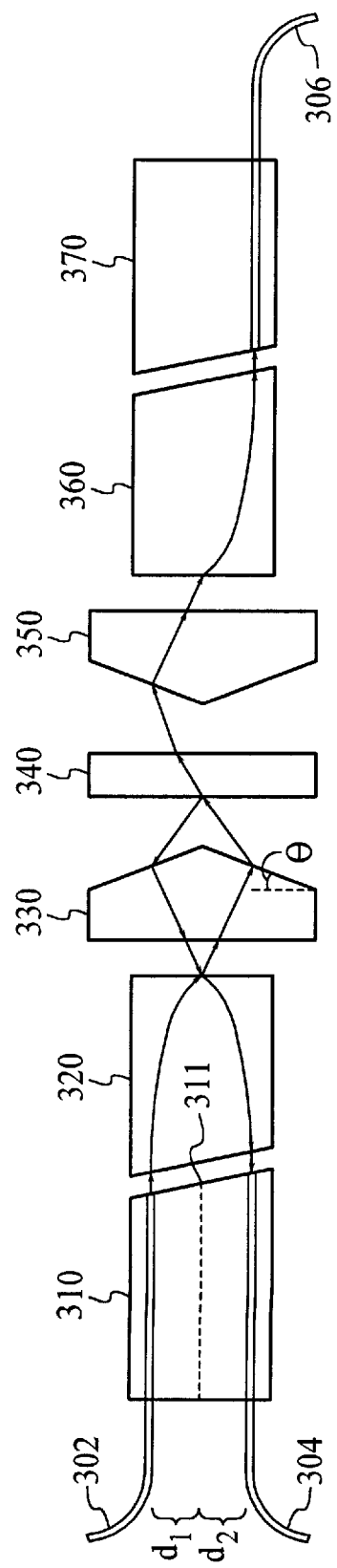
FIG. 4 is a block diagram depicting an alternate embodiment of a system for filtering in a filtering wavelength division multiplexer in accordance with the present invention.

FIG. 4 depicts an alternate embodiment of a system 300 in accordance with the present invention for providing filtering in a WDM. In a preferred embodiment, the system 300 is a filtering WDM which isolates individual channels.

The WDM 300 includes two fibers 302 and 304. The fibers 302 and 304 pass through a holder 310. The first fiber 302 is a first distance from an axis 311 of the holder 310. The second fiber 304 is a second distance from the axis 311 of the holder 310. In a preferred embodiment, the first and second distances are the same. The WDM 300 also includes a first lens 320 for collimating light. In a preferred embodiment, the first lens 320 is a GRIN lens. The WDM 300 further includes a first wedge 330, a filter 340, and a second wedge 350. In a preferred embodiment, the first and second wedges 330 and 350, respectively, are glass wedges which can change the direction of light transmitted by each wedge 330 and 350. The system 300 further includes a second lens 360, a second holder 370 and a third fiber 306 held by the second holder 370.

In a preferred embodiment, a composite signal including at least one channel is input to the WDM 300 over the first fiber 302. The composite signal is then provided to the lens 320 for collimating. After collimation by the lens 320, the first signal is transmitted through a wedge 330. The glass wedge 330 is configured to ensure that the first signal converges at the filter 340. In addition, the combination of the glass wedge and the first distance can be used to tune the angle of incidence between the first signal and the filter 340. As a result, the filter 340 is tuned to transmit a range of wavelengths centered around a particular central wavelengths. Thus, the filter 340 is tuned to isolate a particular channel. The transmitted light passes through the second wedge 350, is collimated by the lens 360, and provided to the fiber 306. The isolated channel is then output over the third fiber 306.

A portion of the first signal not within the range of wavelengths transmitted by the filter 340 is reflected off of the filter 340. The reflected portion of the first signal travels back through the wedge 330 and the lens 320 to be output over the second fiber 304. The second fiber 304 can be coupled to another WDM 300. Thus, if the reflected portion of the first signal contains more than one channel, the WDMs 300 can be cascaded to isolate each channel.

Tuning of the angle of incidence, and thus the central wavelength, is achieved by changing the angle, theta, of the wedge. Thus, a wedge having a different angle can tune the filter 340 to a different central wavelength. Thus, even if the distances $d_1$ and $d_2$ are fixed, the angle of incidence and, therefore, the central wavelength of the filter 340, can be tuned. However, nothing prevents the method and system from also tuning the central wavelength of the filter 340 by rotating the filter 340.

Figure 5:
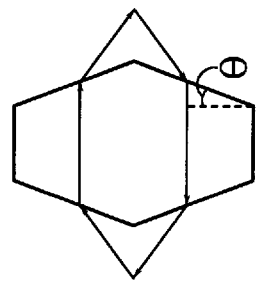
FIG. 5 is a block diagram depicting an alternate embodiment of a wedge in accordance with the present invention.

FIG. 5 depicts an alternate embodiment 335 of the wedge 330 shown in FIG. 4. Also shown is the path of light rays through the wedge 335 when the wedge is used in a WDM such as the WDM 300. The wedge 335 has angled faces to ensure that the light rays converge at the filter 340. When used in the WDM 300, the wedge 335 can also tune the angle of incidence of light with the filter 340 by changing the angle theta.

A method and system has been disclosed for providing filtering. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for filtering comprising:
   a first fiber for carrying a first optical signal;
   a second fiber for carrying a second optical signal;
   a holder for receiving the first optical fiber and the second optical fiber therein;
   a filter for filtering the first optical signal to provide a first filtered optical signal and for filtering the second optical signal to provide a second filtered optical signal;
   a first wedge disposed between the holder and the filter, the wedge for directing the first optical signal towards the filter in a first path and for directing the second optical signal toward the filter in a second path;
   a third optical fiber for receiving the first filtered optical signal; and
   a fourth optical fiber for receiving the second filtered optical signal.

2. The system of claim 1 wherein the first path and the second path are parallel.

3. The system of claim 2 further comprising:
   a first lens disposed between the first wedge and the holder, the filter having a filter face and the first wedge having a first wedge face, the filter face making a first angle with the first wedge face, the first lens for collimating the first optical signal and the second optical signal.

4. The system of claim 3 wherein the first angle between the filter face and the first wedge face is zero degrees.

5. The system of claim 4 further comprising:
   a second holder having an end and an axis, the second holder receiving the third optical fiber and the fourth optical fiber, the third optical fiber being separated from the fourth optical fiber by a second distance.

6. The system of claim 5 further comprising:
   a second wedge disposed between the second holder and the filter, the second wedge for directing the first filtered optical signal in a third path and for directing the second filtered optical signal in a fourth path;
   wherein the third path and the fourth path are converging.

7. The system of claim 6 further comprising:
   a second lens disposed between the second wedge and the second holder, the second lens for collimating the third optical signal and the fourth optical signal.

8. The system of claim 1 wherein the first filtered optical signal and the second filtered optical signal can be tuned by rotating the filter around a rotational axis perpendicular to a holder axis of the holder, thereby rotating the filter with respect to the first wedge.

9. The system of claim 1 wherein the wedge is a glass wedge.

10. A wavelength division multiplexer comprising:
    a first fiber for carrying a first optical signal to the wavelength division multiplexer, the first optical signal including at least one channel;
    a holder having an end and an axis, the holder receiving the first fiber, the first fiber being separated from the axis by a first distance;
    a wedge optically coupled with the holder, the wedge for providing the first optical signal in a first path, the wedge further including a wedge angle; and
    a filter which the first optical signal travelling along the first path impacts at a first angle of incidence, the wedge being disposed between the holder and the filter;
    wherein the wedge angle is selected to tune the first angle of incidence so that the filter transmits a substantial portion of the optical signal centered around at least one particular wavelength.

11. The wavelength division multiplexer of claim 10 wherein the first path allows the first signal to converge in proximity to the filter.

12. The wavelength division multiplexer of claim 11 further comprising:
    a second fiber for carrying a second signal having at least one channel, the second fiber being received in the holder and located a second distance from the axis of the holder;

wherein the second signal includes a portion of the first signal reflected off of the filter.

13. The wavelength division multiplexer of claim 12 further comprising:
   a lens disposed between the first holder and the wedge, the lens for collimating the optical signal; and
   wherein the filter includes a filter face and the lens includes a lens face, and wherein the filter face makes an angle with the lens face.

14. The wavelength division multiplexer of claim 13 wherein the angle between the lens face and the filter face is greater than zero degrees.

15. The wavelength division multiplexer of claim 10 wherein the at least one particular wavelength can be further tuned by rotating the filter around a rotational axis perpendicular to a holder axis of the holder, thereby rotating the filter with respect to the wedge.

16. The wavelength division multiplexer of claim 10 wherein the wedge is a glass wedge.

17. A method for providing filtering comprising the steps of:
   (a) providing a first optical signal over a first fiber;
   (b) providing a second optical signal over a second fiber;
   (c) providing the first optical signal and the second optical signal to a first wedge for directing the first optical signal in a first path and for directing the second optical signal in a second path, the first wedge being disposed between the first and second fibers and a filter;
   (d) filtering the first optical signal using the filter to provide a first filtered optical signal and filtering the second optical signal to provide a second filtered optical signal using a single filter;
   (e) providing the first filtered optical signal to a third fiber; and
   (f) providing the second filtered optical signal to a fourth fiber.

18. The method of claim 17 wherein the first path and the second path are parallel.

19. The method of claim 18 further comprising the step of:
   (g) providing the first optical signal and the second optical signal to a first lens disposed between the first wedge and the holder, the first lens having a first lens face and the filter having a filter face, the first lens face making a first angle with the filter face, the first lens for collimating the first optical signal and the second optical signal.

20. The method of claim 19 wherein the first angle between the first lens face and the filter face is greater than zero degrees.

21. The method of claim 17 wherein the first filter optical signal and the second filtered optical signal can be tuned by rotating the filter around a rotational axis perpendicular to a holder axis of the holder, thereby rotating the filter with respect to the first wedge.

22. The method of claim 17 wherein the wedge is a glass wedge.

23. A method for separating at least one channel from an optical signal having a plurality of channels, the method comprising the steps of:
   (a) providing the optical signal over a first fiber, the first fiber being received in a holder having an end and an axis, the first fiber being separated from the axis by a distance;
   (b) providing the optical signal to a wedge having a wedge angle, the wedge for providing the first optical signal in a first path; and
   (c) providing the optical signal to a filter in the first path, the optical signal having a first angle of incidence with the filter, the wedge being disposed between the filter and the first fiber;
   such that the wedge angle tunes the first angle of incidence so that the filter transmits a substantial portion of the at least one channel of the first optical signal.

24. The method of claim 23 wherein the first path allows the first signal to converge in proximity to the filter.

25. The method of claim 23 wherein the at least one channel can be further tuned by rotating the filter around a rotational axis perpendicular to a holder axis of the holder, thereby rotating the filter with respect to the wedge.

26. The method of claim 23 wherein the wedge is a glass wedge.

* * * * *